(12) United States Patent
Wuerthele et al.

(10) Patent No.: US 12,214,718 B2
(45) Date of Patent: Feb. 4, 2025

(54) SYSTEMS AND METHODS OF INDIRECTLY ILLUMINATING A STEP SURFACE OF A VEHICLE RUNNING BOARD

(71) Applicant: TOYOTA MOTOR ENGINEERING & MANUFACTURING NORTH AMERICA, INC., Plano, TX (US)

(72) Inventors: Stuart R. Wuerthele, Saline, MI (US); Frank A. Richards, Ann Arbor, MI (US); Alexander L. Paradis, Ann Arbor, MI (US)

(73) Assignees: TOYOTA MOTOR ENGINEERING & MANUFACTURING NORTH AMERICA, INC., Plano, TX (US); TOYOTA JIDOSHA KABUSRIKI KAISHA, Aichi-ken (JP)

( * ) Notice: Subject to any disclaimer, the term of this patent is extended or adjusted under 35 U.S.C. 154(b) by 292 days.

(21) Appl. No.: 17/901,474

(22) Filed: Sep. 1, 2022

(65) Prior Publication Data

US 2024/0075869 A1  Mar. 7, 2024

(51) Int. Cl.
*B60Q 1/24* (2006.01)
*B60Q 1/00* (2006.01)
(Continued)

(52) U.S. Cl.
CPC .......... *B60Q 1/247* (2022.05); *B60Q 1/0017* (2013.01); *B60Q 1/0035* (2013.01); *B60R 3/002* (2013.01); *B60R 3/02* (2013.01)

(58) Field of Classification Search
CPC .... B60Q 1/247; B60Q 1/0017; B60Q 1/0035; B60R 3/002; B60R 3/02
See application file for complete search history.

(56) References Cited

U.S. PATENT DOCUMENTS

| 5,915,830 A | 6/1999 | Dickson et al. |
| 6,179,454 B1 | 1/2001 | Hoines |

(Continued)

FOREIGN PATENT DOCUMENTS

CA  2282819 A1  3/2001

OTHER PUBLICATIONS

Amazon, 2PCs 70inch Truck LED Running Board Strips Side Marker Lighting Kits Truck Bed Lights 216-SMD LED Waterproof Flexible Turn Signal Light Bar Strip for Underglow Pickup Trucks, Jeep, Cars (70 inch), https://www.amazon.in/Running-Lighting-Waterproof-Flexible-Underglow/dp/B07XG195WY, retrieved Sep. 1, 2022, 6 pages.

*Primary Examiner* — John D Walters
(74) *Attorney, Agent, or Firm* — HAYNES AND BOONE, LLP

(57) ABSTRACT

Systems and methods of indirectly illuminating a step surface of a vehicle running board are provided. A running board may include an upper step surface and at least one lighting element provided at an inboard underside of the running board to directly illuminate the undercarriage of the vehicle and a ground surface below the running board. The lighting element may be configured to direct light to a reflecting element provided at the undercarriage for reflecting light provided by the at least one lighting element to indirectly illuminate the upper step surface of the running board. Associated vehicles including the running board are provided. Associated methods are also provided.

20 Claims, 3 Drawing Sheets

(51) Int. Cl.
  *B60R 3/00* (2006.01)
  *B60R 3/02* (2006.01)

(56) References Cited

U.S. PATENT DOCUMENTS

| | | |
|---|---|---|
| 6,250,785 B1 | 6/2001 | Mallia et al. |
| 6,659,629 B2 | 12/2003 | Potter et al. |
| 7,621,546 B2 * | 11/2009 | Ross ................... B60R 3/02 280/727 |
| 9,487,127 B2 * | 11/2016 | Salter .................. B60Q 1/247 |
| 9,963,066 B1 | 5/2018 | Salter et al. |
| 10,377,300 B1 * | 8/2019 | Salter ................. B60R 3/002 |
| 10,576,879 B1 * | 3/2020 | Salter ................. B60Q 1/325 |
| 11,644,171 B2 * | 5/2023 | Chen ................. F21S 41/151 362/516 |

* cited by examiner

SYSTEMS AND METHODS OF INDIRECTLY ILLUMINATING A STEP SURFACE OF A VEHICLE RUNNING BOARD

TECHNICAL FIELD

The present disclosure relates generally to vehicle lighting, and, more particularly, to systems and methods for illuminating at least a step surface of a vehicle running board.

BACKGROUND

Some running boards are equipped with one or more lights mounted under or below the running board to illuminate the ground. Some running boards are equipped with one or more lights mounted on or above the running board to directly light a running board step surface. A need exists, however, for systems and methods of illuminating the ground, a vehicle undercarriage, and a running board step surface using a single lighting element.

BRIEF SUMMARY

Various embodiments of the present disclosure include a vehicle. The vehicle includes an undercarriage and a running board extending from the undercarriage and including an upper step surface. The vehicle further includes a lighting element provided on the running board to directly illuminate the undercarriage and a ground surface below the running board. The vehicle further includes a reflecting element provided at the undercarriage for reflecting light provided by the lighting element to indirectly illuminate the upper step surface of the running board.

Various embodiments of the present disclosure include a running board configured to extend from an undercarriage of a vehicle. The running board includes an upper step surface. The running board further includes at least one lighting element provided at an inboard underside of the running board to directly illuminate the undercarriage of the vehicle and a ground surface below the running board. The running board further includes wherein the lighting element is configured to direct light to a reflecting element provided at the undercarriage for reflecting light provided by the at least one lighting element to indirectly illuminate the upper step surface of the running board.

Various embodiments of the present disclosure include a method of illuminating a step surface of a vehicle running board. The method includes directly illuminating, by a lighting element provided on a vehicle running board, an undercarriage of the vehicle and a ground surface below the vehicle running board. The method further includes indirectly illuminating, by a reflecting element provided at the undercarriage of the vehicle, an upper step surface of the vehicle running board by reflecting light provided by the lighting element.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
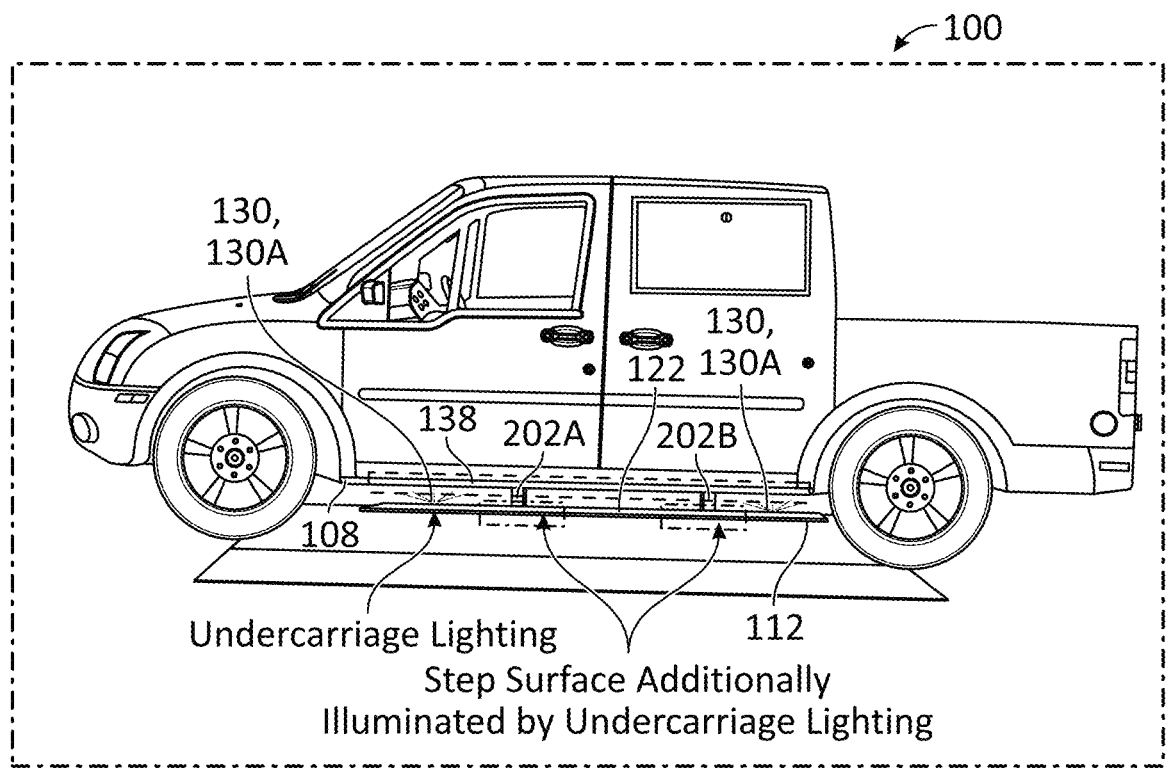
FIG. 1 is a diagram illustrating indirect illumination of a step surface of a vehicle running board, according to one or more embodiments of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

Embodiments of the present disclosure are directed to systems and methods of indirectly illuminating a step surface of a vehicle running board. The step surface may be illuminated indirectly via one or more lights mounted under or below the step surface, such as by reflecting light off the vehicle rocker and/or undercarriage, to aid ingress and/or egress. Some embodiments may also provide, among other features, functional undercarriage lighting, such as for tasks including servicing the vehicle and checking for objects under the vehicle.

Embodiments of the present disclosure may illuminate multiple areas on or around a vehicle in an efficient manner. For example, embodiments may include illuminating the ground below the running board, an undercarriage of the vehicle, and the step surface of the running board using a single lighting element. For example, one or more reflecting elements may be provided at the undercarriage of the vehicle for reflecting light provided by the lighting element to illuminate the step surface of the running board.

FIG. 1 is a diagram illustrating indirect illumination of a step surface of a vehicle running board, according to one or more embodiments of the disclosure. Referring to FIG. 1, a vehicle 100 may include an undercarriage 108 and a running board 112 extending from undercarriage 108. Undercarriage 108 may be a section of vehicle 100 that is underneath the vehicle's body/cabin. For example, undercarriage 108 may define or include at least a portion of the vehicle's chassis (e.g., frame, crossmembers, rails, etc.).

Running board 112, which may be referred to as a vehicle running board or side step, may be a footboard extending along the side of vehicle 100. For example, running board 112 may be a step fitted under one or more side doors of vehicle 100 to assist passengers with vehicle ingress/egress. As shown, running board 112 includes an upper step surface 122 providing a step area for passengers. In embodiments, upper step surface 122 may be treaded to provide traction during vehicle ingress/egress.

Vehicle 100 is depicted as a truck in the illustrative embodiment of FIG. 1; however, in other example embodiments, vehicle 100 may be a van, a bus, a sedan, a utility vehicle (e.g., a SUV, a CUV, etc.) or any other type of vehicle. In embodiments, vehicle 100 is not limited to automobiles, and may include recreational vehicles (RVs), an off-highway vehicle (OHV), a side-by-side vehicle, or a golf cart, among other vehicles.

As shown, light may be directed at each of undercarriage 108, upper step surface 122, and the ground below running board 112. For example, a lighting element 130 (e.g., one lighting element, a plurality of lighting elements) is provided on running board 112 to illuminate the ground below running board 112, undercarriage 108, and upper step surface 122. For instance, lighting element 130 may directly illuminate both undercarriage 108 and a ground surface below running board 112. In addition, upper step surface 122 may be illuminated by lighting element 130 indirectly, such as via a reflecting surface or part of undercarriage 108, as detailed below. For example, light from lighting element 130 may be reflected onto upper step surface 122 by a portion of undercarriage 108.

Indirect illumination of upper step surface 122 via reflection of light provided by lighting element 130 may provide many benefits. For instance, additional or dedicated lights or lamps may not be needed to illuminate upper step surface 122. Indirect illumination of upper step surface 122 may result in less shadows cast by running board 112 onto the ground. Indirect illumination may also produce a softer illumination of upper step surface 122 and limit light shining directly into a person's eye.

Lighting element 130 may be any suitable lighting device or assembly. For example, lighting element 130 may include one or more light-emitting diodes (LEDs), light panels, bulbs, lamps, or the like. In embodiments, lighting element 130 may include logic and/or circuitry, such as one or more printed circuit boards (PCBs), to control operation of lighting element 130.

With continued reference to FIG. 1, vehicle 100 includes a reflecting element 138 to facilitate indirect illumination of upper step surface 122. Reflecting element 138 may be any component of vehicle 100, such as provided at undercarriage 108 of vehicle 100, for reflecting light provided by lighting element 130 to indirectly illuminate upper step surface 122 of running board 112. In embodiments, reflecting element 138 may include at least one of a rocker panel, a rocker, or a frame element of vehicle 100. In embodiments, reflecting element 138 may be any portion of undercarriage 108 positioned above upper step surface 122 of running board 112.

Figure 2:
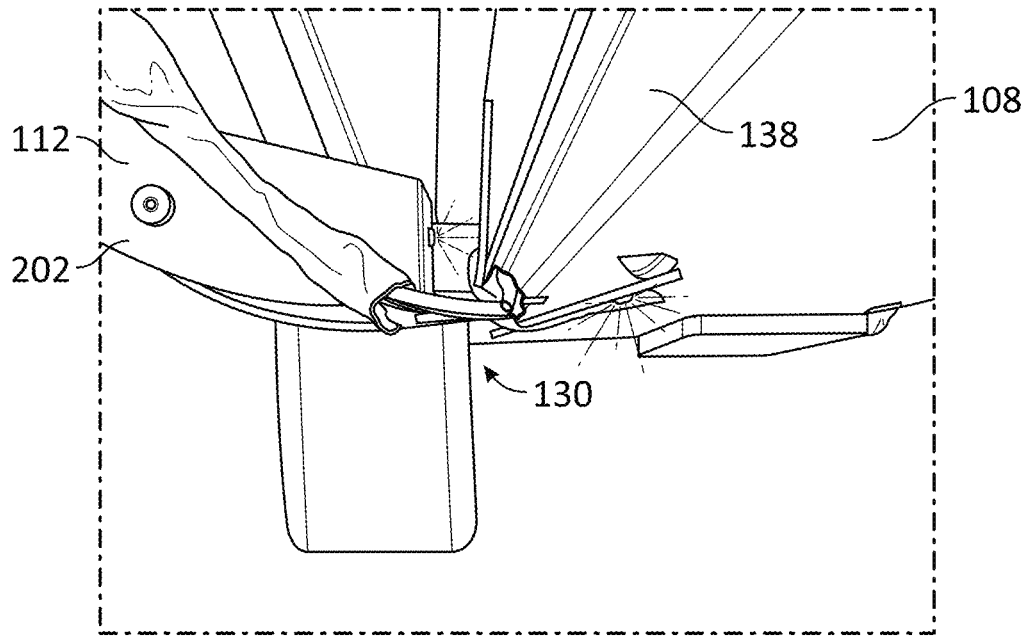
FIG. 2 is a diagram illustrating a lighting element configuration for indirectly illuminating a step surface of a running board, according to one or more embodiments of the disclosure.

FIG. 2 is a diagram illustrating a lighting element configuration for indirectly illuminating upper step surface 122 of running board 112, according to one or more embodiments of the disclosure. Referring to FIGS. 1-2, running board 112 may include at least one mount 202 (e.g., a first mount 202A and a second mount 202B in FIG. 1) securing running board 112 to undercarriage 108. As shown, lighting element 130 may be provided at or adjacent mount 202, such as a first lighting element 130A provided at or adjacent first mount 202A and a second lighting element 130B provided at or adjacent second mount 202B, etc.

Figure 3:
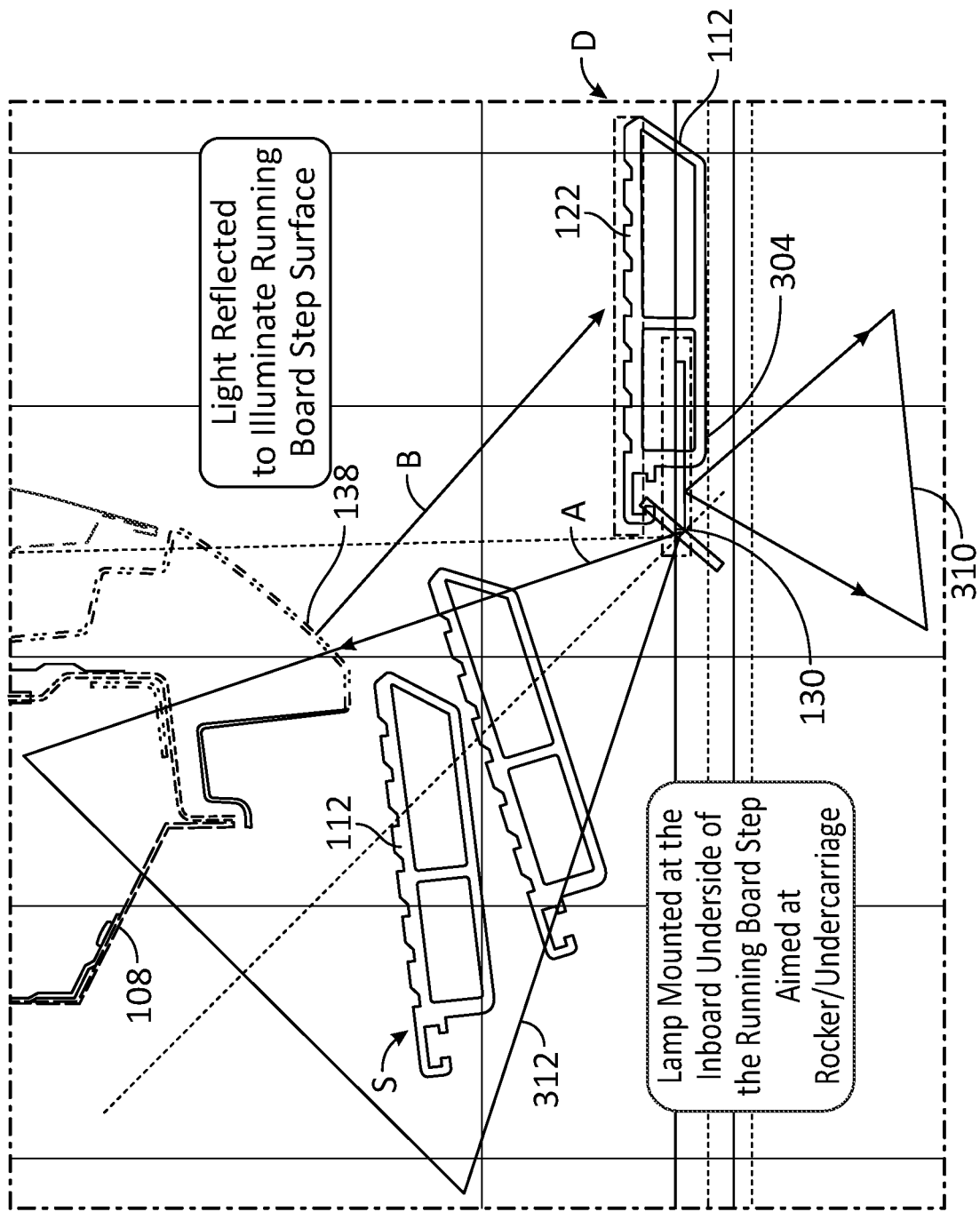
FIG. 3 is a cross-sectional diagram illustrating the lighting element configuration, according to one or more embodiments of the disclosure.

FIG. 3 is a cross-sectional diagram illustrating the lighting element configuration, according to one or more embodiments of the disclosure. Referring to FIGS. 2-3, lighting element 130 may be mounted below upper step surface 122 of running board 112. For example, lighting element 130 may be provided at an inboard underside 304 of running board 112. In such embodiments, light produced by lighting element 130 is directed directly toward both the ground and undercarriage 108 of vehicle 100. As shown in FIG. 3, a first portion of light 310 provided by lighting element 130 may be directed at the ground surface, and a second portion of light 312 provided by lighting element 130 may be directed at undercarriage 108. For example, the first portion of light 310 may be aimed at the ground surface, and the second portion of light 312 may be aimed at undercarriage 108 (e.g., at reflecting element 138).

As best illustrated in FIG. 3, reflecting element 138 is provided such that light is redirected back toward running board 112, and, specifically, onto upper step surface 122 of running board 112. For instance, light from lighting element 130 may be directed toward reflecting element 138, as illustrated by arrow A, and redirected back toward upper step surface 122, as illustrated by arrow B. In this manner, the same lighting element is utilized for illuminating each of the ground, undercarriage 108, and upper step surface 122 of running board 112.

In some embodiments, running board 112 may be motorized to move between multiple positions. For example, as illustrated in FIG. 3, running board 112 may move between a stored position S and a deployed position D. In such embodiments, upper step surface 122 may be illuminated indirectly by reflection from reflecting element 138 when running board 112 is positioned in the deployed position D.

Figure 4:
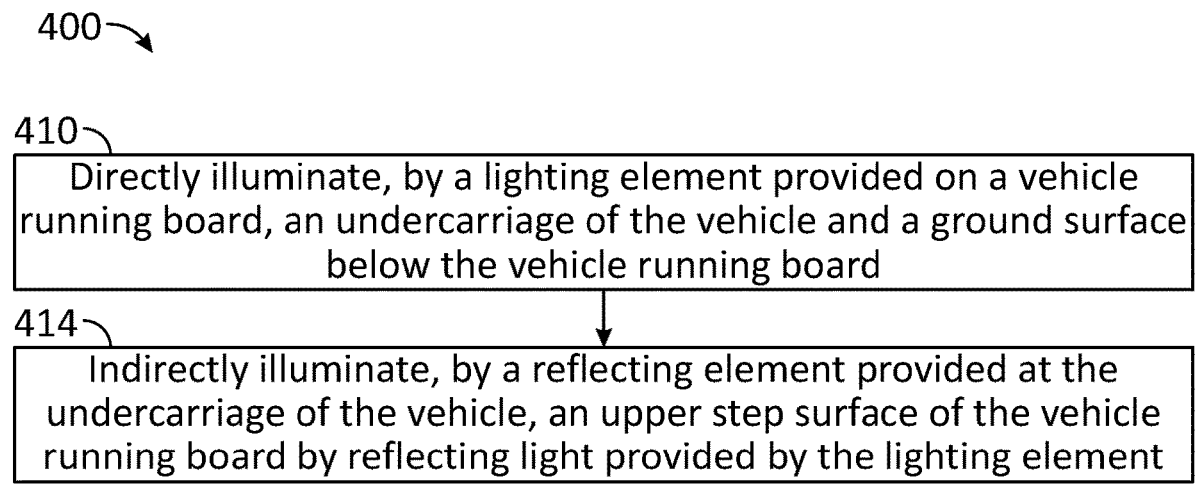
FIG. 4 is a flowchart of a method of illuminating a step surface of a vehicle running board, according to one or more embodiments of the disclosure.

FIG. 4 is a flowchart of a method 400 of illuminating a step surface of a vehicle running board, according to one or more embodiments of the disclosure. For explanatory purposes, method 400 is described herein with reference to FIGS. 1-3, although method 400 is not limited to the embodiments illustrated in FIGS. 1-3. Note that one or more operations in FIG. 4 may be combined, omitted, and/or performed in a different order as desired.

In block 410, method 400 includes directly illuminating, by a lighting element provided on a vehicle running board (e.g., by lighting element 130 provided on running board 112), an undercarriage of the vehicle (e.g., undercarriage 108 of vehicle 100) and a ground surface below the vehicle running board, such as in a manner as described above with reference to FIGS. 1-3. In embodiments, block 410 may include directing a first portion of light provided by the lighting element at the ground surface. In embodiments, block 410 may include directing a second portion of light provided by the lighting element at the undercarriage. The lighting element may be similar to lighting element 130, described above. For example, the lighting element may be mounted at an inboard underside of the vehicle running board.

In block 414, method 400 includes indirectly illuminating, by a reflecting element provided at the undercarriage of the vehicle (e.g., by reflecting element 138), an upper step surface of the vehicle running board by reflecting light provided by the lighting element, such as in a manner as described above with reference to FIGS. 1-3. The reflecting element may be similar to reflecting element 138, described above. For instance, the reflecting element may include at least one of a rocker panel or a frame element of the vehicle.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art. The intention is to cover all modifications, equivalents and alternatives falling within the spirit and scope of the disclosure as defined by the claims.

For example, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments. In addition, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures. In some embodiments, one or more of the operational steps in each embodiment may be omitted.

What is claimed is:

1. A vehicle comprising:
   an undercarriage;
   a running board extending from the undercarriage and comprising an upper step surface;
   a lighting element provided on the running board to directly illuminate the undercarriage and a ground surface below the running board; and
   a reflecting element provided at the undercarriage for reflecting light provided by the lighting element to indirectly illuminate the upper step surface of the running board.

2. The vehicle of claim 1, wherein the lighting element is mounted below the upper step surface of the running board.

3. The vehicle of claim 2, wherein the lighting element is mounted at an inboard underside of the running board.

4. The vehicle of claim 1, wherein the reflecting element comprises at least one of a rocker panel or a frame element of the vehicle.

5. The vehicle of claim 1, further comprising:
   a mount securing the running board to the undercarriage; and
   wherein the lighting element is provided at the mount.

6. The vehicle of claim 1, wherein:
   a first portion of light provided by the lighting element is directed at the ground surface; and
   a second portion of light provided by the lighting element is directed at the undercarriage.

7. The vehicle of claim 1, wherein the running board is motorized to move between a stored position and a deployed position.

8. The vehicle of claim 7, wherein the upper step surface is indirectly illuminated by reflection from the reflecting element when the running board is positioned in the deployed position.

9. A running board configured to extend from an undercarriage of a vehicle, the running board comprising:
   an upper step surface; and
   at least one lighting element provided at an inboard underside of the running board to directly illuminate the undercarriage of the vehicle and a ground surface below the running board,
   wherein the lighting element is configured to direct light to a reflecting element provided at the undercarriage for reflecting light provided by the at least one lighting element to indirectly illuminate the upper step surface of the running board.

10. The running board of claim 9, wherein the at least one lighting element is mounted below the upper step surface of the running board.

11. The running board of claim 9, further comprising a first mount and a second mount to secure the running board to the undercarriage of the vehicle.

12. The running board of claim 11, wherein the at least one lighting element comprises:
    a first lighting element provided at the first mount; and
    a second lighting element provided at the second mount.

13. The running board of claim 9, wherein:
    the running board is motorized to move between a stored position and a deployed position; and
    the upper step surface is indirectly illuminated by reflection from the reflecting element when the running board is positioned in the deployed position.

14. The running board of claim 9, wherein:
    a first portion of light provided by the lighting element is directed at the ground surface; and
    a second portion of light provided by the lighting element is directed at the undercarriage.

15. A vehicle comprising:
    the undercarriage;
    the running board of claim 9 extending from the undercarriage; and
    the reflecting element provided at the undercarriage.

16. The vehicle of claim 15, wherein the reflecting element comprises at least one of a rocker panel or a frame element of the vehicle.

17. A method comprising:
    directly illuminating, by a lighting element provided on a vehicle running board, an undercarriage of the vehicle and a ground surface below the vehicle running board; and
    indirectly illuminating, by a reflecting element provided at the undercarriage of the vehicle, an upper step surface of the vehicle running board by reflecting light provided by the lighting element.

18. The method of claim 17, wherein the lighting element is mounted at an inboard underside of the vehicle running board.

19. The method of claim 17, wherein the reflecting element comprises at least one of a rocker panel or a frame element of the vehicle.

20. The method of claim 17, wherein the directly illuminating the ground surface and the undercarriage comprises:
    directing a first portion of light provided by the lighting element at the ground surface; and directing a second portion of light provided by the lighting element at the undercarriage.

\* \* \* \* \*

UNITED STATES PATENT AND TRADEMARK OFFICE
CERTIFICATE OF CORRECTION

| | | |
|---|---|---|
| PATENT NO. | : 12,214,718 B2 | Page 1 of 1 |
| APPLICATION NO. | : 17/901474 | |
| DATED | : February 4, 2025 | |
| INVENTOR(S) | : Stuart R. Wuerthele, Frank A. Richards and Alexander L. Paradis | |

It is certified that error appears in the above-identified patent and that said Letters Patent is hereby corrected as shown below:

On the Title Page

Item (73) reads:
"TOYOTA MOTOR ENGINEERING & MANUFACTURING NORTH AMERICA, INC. (Plano, TX); TOYOTA JIDOSHA KABUSRIKI KAISHA (Aichi-ken, JP)"

Should read:
"TOYOTA MOTOR ENGINEERING & MANUFACTURING NORTH AMERICA, INC. (Plano, TX); TOYOTA JIDOSHA KABUSHIKI KAISHA (Aichi-ken, JP)"

Signed and Sealed this
Eighteenth Day of March, 2025

Coke Morgan Stewart
*Acting Director of the United States Patent and Trademark Office*